United States Patent [19]

Takeyari et al.

[11] Patent Number: 5,576,876
[45] Date of Patent: Nov. 19, 1996

[54] OPTICAL REGENERATOR AND AN OPTICAL TRANSMISSION SYSTEM

[75] Inventors: Ryoji Takeyari, Koganei; Takashi Funada, Yokosuka; Yukihiko Wakai; Kazuo Hagimoto, both of Yokohama, all of Japan

[73] Assignees: Hitachi, Ltd.; Nippon Telegraph and Telephone Corporation, both of Tokyo, Japan

[21] Appl. No.: 384,838

[22] Filed: Feb. 7, 1995

[30] Foreign Application Priority Data

Feb. 7, 1994 [JP] Japan .................................. 6-013307

[51] Int. Cl.$^6$ ............................................... H04B 10/16
[52] U.S. Cl. ............................ 359/176; 359/158; 359/179
[58] Field of Search ................................. 359/174–177, 359/179, 152–153, 158

[56] References Cited

U.S. PATENT DOCUMENTS 4,736,120  4/1988  Foster ........................................ 359/174
5,392,147  2/1995  Kaede ........................................ 359/181

FOREIGN PATENT DOCUMENTS 0534433   3/1993   European Pat. Off. ............... 359/176
0571134A1 11/1993 European Pat. Off. .
0581525A1  2/1994 European Pat. Off. .
57-194653 11/1982 Japan .

*Primary Examiner*—Leslie Pascal
*Attorney, Agent, or Firm*—Antonelli, Terry, Stout & Kraus

[57] ABSTRACT

A a first clock extraction device included in the receiving section of the optical regenerator recovers a receiving clock. The receiving clock follows the jitter contained in a receiving optical signal caused by fiber wavelength dispersion. The receiving optical signal is detected in synchrony with the receiving clock. A transmission section includes a transmitter for generating a transmission optical signal changed in phase in such a manner as to suppress the stimulated Brillouin scattering and a second clock extraction device for regenerating the transmission clock not following the jitter. The data of the receiving optical signal is processed at a processing unit, and intensity-modulated on the basis of the data thus processed. The timing of this modulation is synchronized with the transmission clock. The receiving clock is synchronized with the jitter, and therefore no logic error occurs. Since the transmission clock does not follow the jitter, the jitter is prevented from accumulating.

22 Claims, 4 Drawing Sheets

OPTICAL REGENERATOR AND AN OPTICAL TRANSMISSION SYSTEM

BACKGROUND OF THE INVENTION

The present invention relates to an optical regenerator and an optical transmission system for multi-repeater optical transmission, or more in particular to a high-quality optical transmission technique employing a measure against what is called the stimulated Brillouin scattering in order to produce a high launch power.

In an optical transmission system, implementation of practical optical amplifiers has made it possible to produce a high-output optical transmission signal from an optical transmitter. The power of the optical transmission signal that can be applied to an optical fiber coupled to the repeater, however, is limited by the stimulated Brillouin scattering (hereinafter referred to simply as "SBS") of the optical fiber.

A method for improving the power of the optical transmission signal that can be applied to the optical fiber is described in ECOC Journal, pp.657–660, (1991) by P. M. Gabla, et al.

SUMMARY OF THE INVENTION

Accordingly, it is an object of the present invention to provide an optical transmission system that can transmit an optical transmission signal with high power.

Another object of the invention is to provide an optical regenerator suitable for the optical transmission system repeated by a plurality of regenerators.

According to P. M. Gabla, et al., SBS can be suppressed by modulating the phase or frequency of the signal input to the optical fiber to have an uncontinuous phase characteristic. In the case where the input signal to an end of the optical fiber, i.e., the frequency of the output signal of a repeater is different, however, the time of arrival of the signal at the other end of the optical fiber is diverged due to the wavelength dispersion of the optical fiber, with the result that a jitter appears in the signal waveform at the other end.

Detailed description will be made with reference to FIG. 1. In FIG. 1, reference numeral 1 designates an anti-SBS transmitter including a semiconductor laser 9 as a CW light source which emits at 1.3 μm or 1.5 μm drived by a predetermined magnitude of current. Numeral 8 designates a amplitude modulator for frequency-modulating with a sinusoidal wave (several kHz to several MHz) the predetermined current applied to the semiconductor laser. As a result, the output phase or frequency of the semiconductor laser 9 is modulated, thereby generating a carrier signal which has an uncontinuous phase capable of suppressing SBS. In the process, the output amplitude of the semiconductor laser is also modulated. This amplitude modulation, however, is negligibly small. The amplitude of this carrier signal is modulated in accordance with the data signal by an external modulator 10 and makes up an optical transmission signal. When a signal with a discrete phase is applied to an optical fiber 11, the output waveform of the optical fiber contains a jitter for the reason described above. The observed frequency of the jitter coincides with the frequency of the frequency modulator 8.

As shown in FIG. 2, the frequency modulator 8 may be eliminated and the phase of the output of the laser 9 may be modulated directly using a phase modulator 100 to suppress the jitter.

Repeaters 20 and 30 which have been studied by the inventors are shown in FIGS. 3A and 3B.

In these repeaters, a received signal containing the jitter is logically decided at an edge of the clock pulse extracted from the received signal and then transmitted as an optical signal (by regeneration repeating). The modulation frequency of the anti-SBS frequency modulation is assumed to be fSBS, and the cut-off frequency of the jitter transfer function for a clock extraction device to be fC1. The configuration with the relation fSBS<fC1 held is shown in FIG. 3A, the jitter transfer function for the clock extraction device 4' in FIG. 4A. Since the jitter frequency fSBS of the receive signal is lower than the cut-off frequency of the jitter transfer function, the clock phase extracted by the clock extraction device 4' follows the jitter of the data. As a consequence, the data phase coincides with the clock phase at a decision block 5, and therefore no logical error of the data is caused due to the jitter. In spite of this, the jitter on input side passes through the optical regenerator 20 and appears in a similar form in the optical intensity waveform on the output side. The frequency modulation for SBS suppression is required to be performed for each optical regenerator. After transmission through the optical fiber 11, therefore, the frequency modulation is converted into a jitter by wavelength dispersion, resulting in an increased jitter. In this way, when fSBS is smaller than fC1, the problem is that the jitter is accumulated during the multi-repeater transmission.

Now, the configuration for the relation fSBS>fC1 held is shown in FIG. 3B, and the jitter transfer function for the clock extraction device 4" in FIG. 4B. In view of the fact that the input jitter frequency fSBS is higher than the cut-off frequency of the jitter transfer function, the clock extraction device 4" suppresses the jitter of frequency fSBS. No jitter by anti-SBS frequency modulation, therefore, appears on the output. Since the clock extracted the clock extraction device 4" fails to follow the data jitter, therefore, an error occurs between the clock phase and the data phase at the decision block 5, which is likely to cause a logic error of the data.

In these regenerators, the transmission quality is deteriorated due to the jitter caused when the SBS is suppressed.

Accordingly, it is an object of the present invention to provide an optical regenerator and an optical transmission system in which the logical error and the jitter accumulation due to the received jitter can be obviated in the presence of jitters due to the phase or frequency modulation performed for the SBS suppression.

In order to achieve the above-mentioned object, there is provided according to the invention an optical regenerator in which an optical transmission signal frequency-modulated by which phase of the signal changes to suppress the SBS and further intensity-modulated by data is transmitted as an optical output, the optical regenerator having two functions of clock extraction for decision of the received signal and clock regeneration for a transmission clock. In other words, as shown in FIG. 5, there is provided an optical regenerator comprising a first clock extraction device 4' for decision of the received signal and a second clock extraction device 4" for regenerating the transmission clock, wherein the relation holds that fC2<fSBS<fC1, where fSBS is the modulation frequency for frequency modulation of the optical transmission signal, fC1 is the cut-off frequency of the jitter transfer function of the first clock extraction device 4', and fC2 is the cut-off frequency of the jitter transfer function for the second clock extraction device 4".

In this optical regenerator, suppose the first clock extraction device 4' and the second clock extraction device 4" are cascaded as shown in FIG. 5. The first clock extraction device 4' follows the input and the second clock attraction device 4" can easily suppress the jitter through the extraction devices 4'. This configuration is desirable as the jitter tolerance and the jitter transfer characteristic can be improved simultaneously.

Also, in order to achieve the above-mentioned objects of the invention, there is provided according to the present invention a multi-repeater optical transmission system for transmitting an optical transmission signal frequency-modulated and further intensity-modulated by data as an optical output, in which the optical transmission signal of the transmitter is frequency-modulated with frequency fSBS, a corresponding repeating receiver includes a first clock extraction device 4' for decision the received signal and a second clock extraction device 4" for regenerating the transmission clock as a clock for transmission data, as shown in FIG. 5, and the relation is held that fC2<fSBS<fC1 where fC1 is the cut-off frequency of the jitter transfer function for the first clock extraction device and fC2 the cut-off frequency of the jitter transfer function for the second clock extraction device.

Even when a jitter occurs in the received signal due to the frequency modulation for SBS suppression, the relation fSBS<fC1 causes the phase of the input clock to the decision block to follow the phase of the input data and therefore no error occurs. In view of the fact that the transmission clock holds the relation fC2<fSBS, on the other hand, the frequency component of jitter for anti-SBS frequency modulation is suppressed, and therefore jitters are not added independently or accumulated at the time of multiple repeating operations. In this way, the present invention is provided to solve the two problems of jitter and the logical error due to the input jitter at the same time.

In the foregoing description, assume that the anti-SBS transmitter shown in FIG. 2 is used. In the case where the phase uncontinuity of the transmission signal is converted to the instantaneous frequency or in the case where the modulation by the frequency modulator 8 is not by sinusoidal wave, as shown in FIGS. 4C and 4D, the instantaneous frequency corresponding to the modulation frequency fSBS has a certain bandwidth. In this case, the relations hold that fC2<fSBSL and fSBSH<fC1, where fC1 is the cut-off frequency of the jitter transfer function of the first clock extraction device 4' and fC2 is the cut-off frequency of the jitter transfer function of the second clock extraction device 4".

BRIEF DESCRIPTION OF THE DRAWINGS

These and other objects and technical advantages of the present invention will be readily apparent from the following description of the preferred exemplary embodiments of the invention in conjunction with the accompanying drawings, in which.

DESCRIPTION OF THE PREFERRED EMBODIMENTS

Embodiments of the present invention will be described in detail below.

Figure 5:
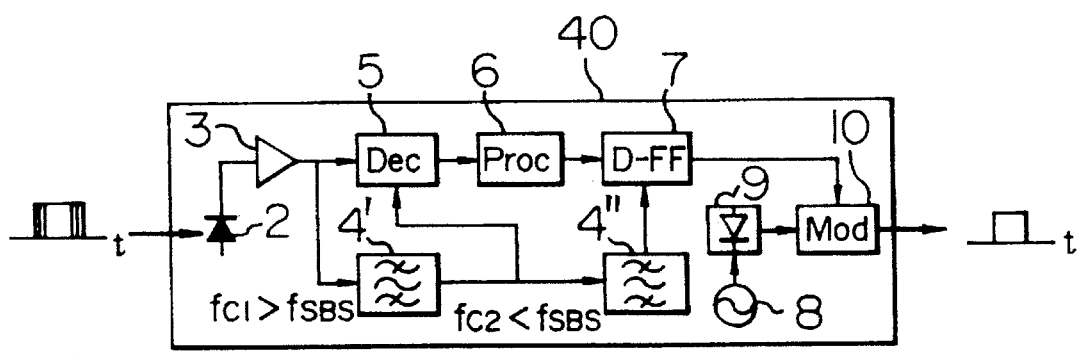
FIG. 5 is a diagram showing the configuration of an optical regenerator according to a first embodiment of the invention.

An example configuration of an optical regenerator according to a first embodiment is shown in FIG. 5. Numeral 40 designates an optical regenerator unit, numeral 2 a photodiode, numeral 3 an equalizing amplifier, and numeral 4' a first clock extraction device. The clock extraction device, which includes such functions as nonlinear extraction, is represented by a tank circuit related to the jitter characteristic. Numeral 5 designates a decision block 9 numeral 6 a digital signal processing section for data processing required for regenerator, numeral 7 a D-FF (D-type flip-flop), and numeral 4" a second clock extraction device. The clock supply for driving the digital processing section 6 is not shown as it is not important in terms of configuration. The D-FF 7, which indicates that the phase (timing) of the output data is determined by the clock supplied from the clock extraction device 4", may be included in the digital processing section 6 depending on the particular configuration. Numeral 8 designates an amplitude modulation oscillator for frequency modulation suppressing SBS, numeral 9 a semiconductor laser, and numeral 10 an external modulator.

First, the operation at the transmitting end will be explained. When the current supplied to the semiconductor laser 9 is modulated by an oscillator 8 of a frequency fSBS in order to reduce SBS, the light spectrum of the output of the semiconductor laser is diverged. This light is modulated by data through the external modulator 10 thereby to produce an optical signal intensity-modulated according to the data.

Figure 1:
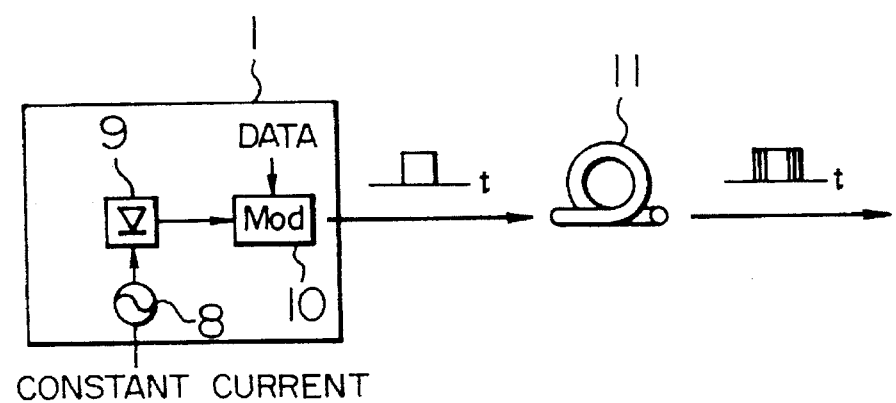
FIGS. 1 and 2 are schematic diagrams showing an anti-SBS transmitter and jitter generation.
Figure 2:
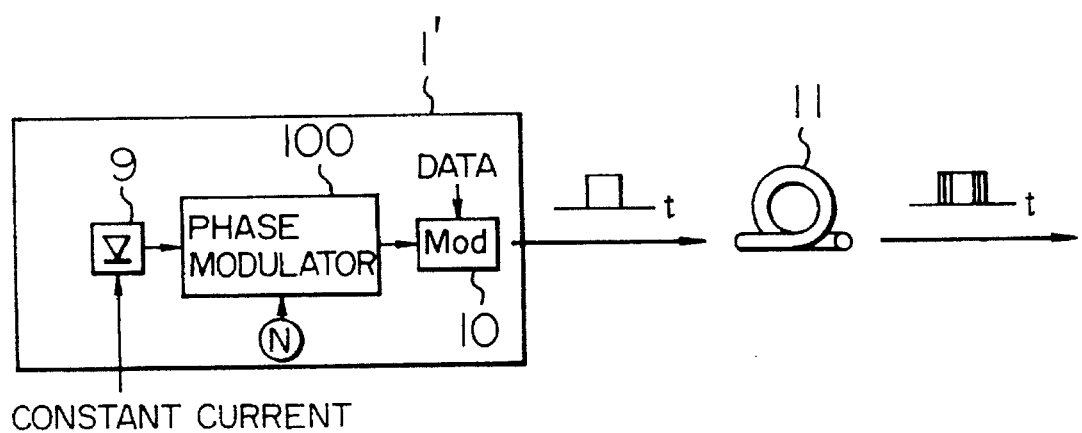
Figure 3A:
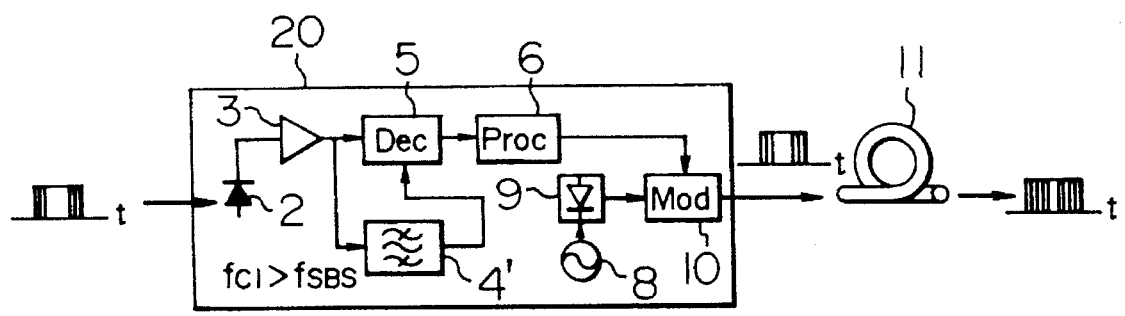
FIGS. 3A and 3B are diagrams showing the configuration of a repeater studied by the inventors.
Figure 3B:
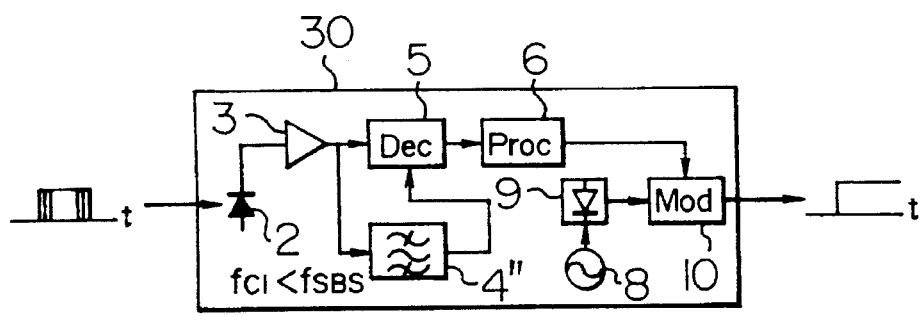
Figure 4A:
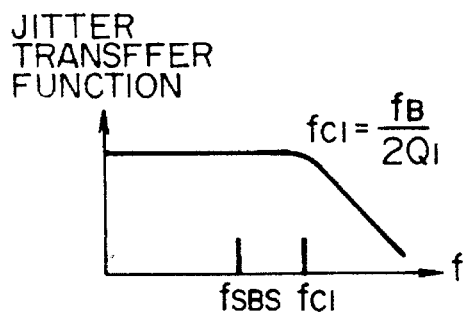
FIGS. 4A to 4D are diagrams showing the jitter transfer characteristic of the clock extraction devices.
Figure 4B:
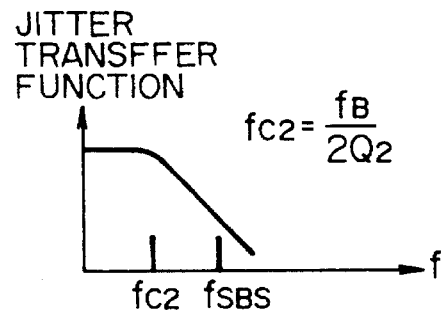
Figure 4C:
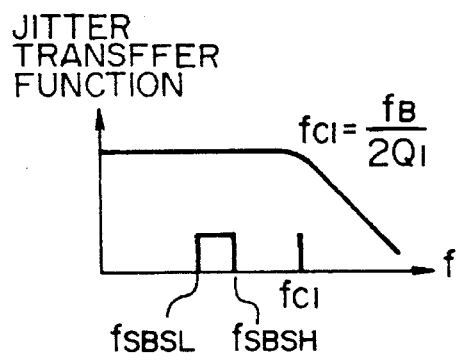
Figure 4D:
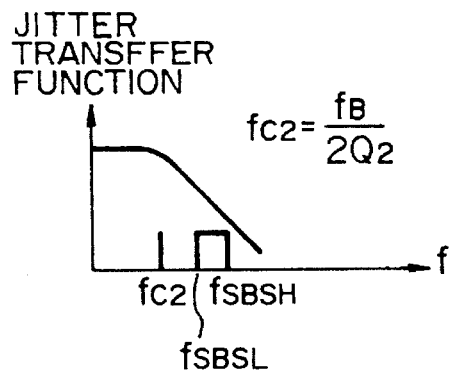

Next, the operation at the receiving end will be explained. The optical signal received through the dispersive optical fiber contains a jitter according to the principle shown in FIG. 1. This received optical signal is converted into a current by the photodiode 2, amplified by the equalizing amplifier 3, and then is distributed between the decision block 5 and the first clock extraction device 4'. The first clock extraction device 4', which generally includes a nonlinear extractor, for example, full-wave rectifier, a tank circuit and a limitting amplifier, may alternatively use a PLL. Provided, however, that fSBS<fC1 where fC1 is the cut-off frequency of the jitter transfer function. In the case where a tank circuit is used for the clock extraction device 4', Q1 is determined as Q1=fB/(2fC1), where fB is the transmission bit rate. In actual transmission systems, it is necessary that 500<Q1<1500, and fSBS is required to be determined after fC1 has been determined for various reasons. The clock recovered at the clock extraction device 4' is supplied as a timing signal for logic decision on the equalizing amplification signal to the decision block 5 on the one hand and is applied to the second clock extraction device 4" at the same time. Given the relation that fSBS<fC1, the jitter of frequency fSBS passes through the clock extraction device 4'. As a result, the clock supplied to the clock extraction device 4' follows the jitter of the equalizing amplification signal applied to the decision block 5. There occurs, therefore, no logic error of data which otherwise might be caused by the jitter generated for SBS suppression.

The clock extraction device 4" is for removing the jitter of the clock recovered at the clock extraction device 4', and includes a tank circuit alone or a PLL. The clock extraction device 4" is input the clock including the jitter of frequency fSBS, and in order to suppress this jitter, the relation is held fC2<fSBS. The transmission data is output syncronized with the clock regenerated at the clock extraction device 4" using the D-FF 7. As a consequence, the jitter of frequency fSBS input to the optical repeater 40 is removed from the output. Also, no logic error of data occurs which otherwise might be caused by the jitter of frequency fSBS.

As will be seen from the foregoing embodiment, the object of the invention is achieved by establishing the relation fC2<fSBS<fC1, where fSBS is the frequency-modulating frequency fSBS for SBS suppression, fC1 is the cut-off frequency of the jitter transfer function for the first clock extraction device, and fC2 is the cut-off frequency of the jitter transfer function for the second clock extraction device. The difference between fC1 and fSBS, which may be small, is preferably about one order of magnitude considering a margin. Also, the difference between fSBS and fC2 should preferably be one order of magnitude. For example, according to the embodiment under consideration, fSBS is set to 10 kHz to 1 MHz, fC1 to 3 MHz to 10 MHz, and fC2 to 1 kHz to 0.1 MHz for 10 Gb/s transmission.

Unlike in the aforementioned embodiment in which the first clock extraction device and the second clock extraction device are connected in cascade, parallel connection of the first and second clock extraction devices has a similar same effect. Also, according to the above-mentioned embodiment, the semiconductor laser 9 for SBS suppression is frequency-modulated with a sinusoidal wave. A similar effect is obtained, however, by the frequency modulation with other than a sinusoidal wave or by the phase modulation instead of frequency modulation as far as fC2 is set to less than the lower limit (fSBSL) of the spectrum of the modulation signal and fC1 to more than the upper limit (fSBSH) of the spectrum of the modulation signal.

When a multiplicity of repeaters as described with reference to the foregoing embodiment are connected, jitters will neither accumulate nor cause a logic error. As a result, a transmission system comprising such repeaters can realize high-quality optical transmission between remote sites.

Figure 6:
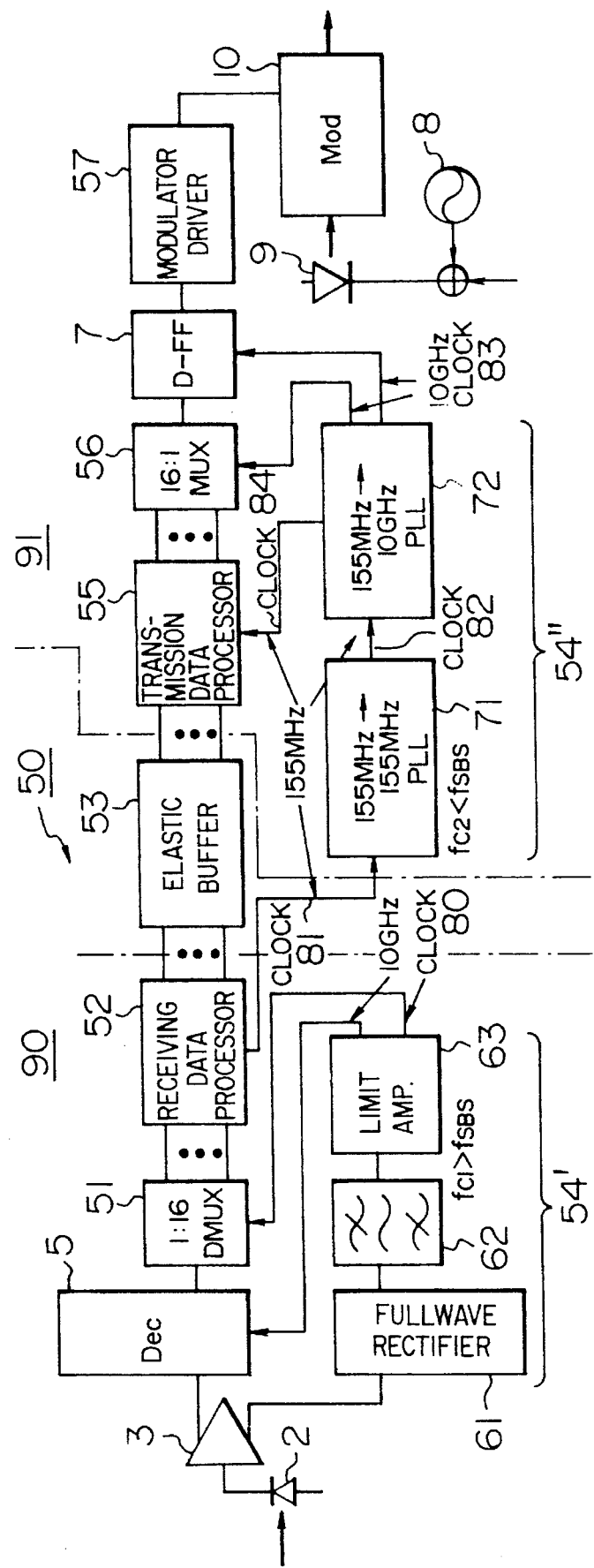
FIG. 6 is a diagram showing the configuration of an optical regenerator according to a second embodiment of the invention.

A repeater 50 according to another embodiment for 10 Gb/s optical regenerate is shown in FIG. 6. In FIG. 6, the component parts which perform the same operation as the corresponding parts in FIG. 5 are designated by the same reference numerals respectively and will not be fully described. A first clock extraction device 54', like the first clock extraction device 4' of FIG. 5, is for recovering the clock in order not to cause any logic error due to jitters. The first clock extraction device 54' includes a full-wave rectifier 61, a tank circuit 62 and a limitting amplifier 63. The transmission optical signal is converted into a first electrical signal at a photodiode 2, which first electrical signal is amplified at an amplifier 3 and is distributed between the first clock extraction device 54' and the decision block 5. The first clock extraction device 54' recovers the clock signal 80 (10 GHz) on the basis of the first electrical signal distributed. The clock signal 80 is divided to 1/16 in frequency by a demultiplexer 51, and after being further reduced to 155 MHz by a frequency divider circuit not shown and built in a receive data processing section 52, is sent to a first PLL circuit 71 as a second clock signal 81. The first PLL circuit 71 is a filter for removing the jitter contained in the second clock signal. A third clock 82 free of the jitter is sent to a second PLL circuit 72 and further to a transmission data processing section 55. The first electrical signal identified at the decision block 5 is parallely converted in frequency by the demultiplexer 51 and an internal frequency dividing circuit into a second electrical signal. This second electrical signal is processed at an arithmetic circuit of the processing section 52. The clock signal 82 free of jitters is increased in frequency from 155 MHz up to 10 GHz by the second PLL circuit 72 (to form a clock signal 83). The transmission data processing section 55 operates at a timing of the 155 MHz clock signal 84. The frequency of the transmission data rate is increased up to 10 GHz by a multiplexer 56 and a frequency multipher circuit not shown and built in the processing section 55. The transmission data is applied to a modulator driver 57 at a timing of the clock signal 83 by means of the D-FF 7.

An elastic buffer 53 arbitrates between the phase of writing data at CLOCK 81 including the jitter and the phose of readiry data at CLOCK 84 including nogitter. As a result, data are positively delivered from the receiver 90 to the transmitter 91.

As far as the second PLL circuit 72 is provided with the function of removing jitters, the first PLL circuit 71 is done without. According to the embodiment under consideration, the cut-off frequency fC1 of the tank circuit 62 is set to 3 MHz to 10 MHz, and the cut-off frequency fC2 of loop filter for the first PLL circuit 71 to 1 kHz. The cut-off frequency of loop filter the second PLL circuit 72 could not be reduced below 3 MHz for the reason of reducing random jitter. Consequently, the first PLL circuit 71 is required.

The operation of the processing sections 52 and 55 is described in U.S. patent application Ser. No. 08/044,425 filed Apr. 7, 1993 which application is incorporated herein by reference.

The repeater 50 according to the present embodiment, like the repeater 40 in FIG. 5, effectively prevents the logic error and the jitter accumulation even when a jitter is contained in the received signal.

We claim:

1. An optical regeneration repeater comprising:

means for receiving an optical signal from a different optical regeneration repeater or transmitter, said means regenerating data from a received said optical signal;

means for generating a transmission optical carrier having an uncontinuous phase in such a manner so as to suppress a stimulated Brillouin scattering;

means for modulating said transmission optical carrier on a basis of the data regenerated by said means for receiving;

means for transmitting said modulated optical signal;

first clock extraction means for recovering a first clock from said optical signal, said first clock incorporating a jitter; and second clock extraction means for generating from said optical signal a second clock for giving a timing for said transmission optical carrier, said second clock not incorporating said jitter.

2. An optical regeneration repeater according to claim 1, wherein said optical regeneration repeater operates according to a relationship of fC2<fSBS<fC1, where fSBS is a frequency corresponding to the uncontinuous phase change of the received said optical signal, fC1 is a cutoff frequency of a jitter transfer function of said first clock extraction means, and fC2 is a cut-off frequency of a jitter transfer function of said second clock extraction means.

3. An optical regeneration repeater according to claim 1, wherein said second clock extraction means recovers said second clock from said first clock.

4. An optical regeneration repeater according to claim 2, wherein said fSBS has a bandwidth, and said optical regeneration repeater operates according to a relationship of fC2<fSBSL and fSBSH<fC1, where fSBSH and fSBSL are a maximum value and minimum value of the bandwidth, respectively.

5. An optical regeneration repeater according to claim 1, wherein said means for generating a transmission optical carrier includes a semiconductor laser providing a source of CW oscillation and an amplitude modulator for modulating a current applied to said semiconductor laser.

6. An optical regeneration repeater according to claim 1, wherein said means for generating the transmission optical carrier includes a semiconductor laser providing a CW oscillation source oscillating at a predetermined frequency and a phase modulator for phase-modulating an output light of said semiconductor laser.

7. An optical regeneration repeater according to claim 2, wherein said first clock extraction means includes a tank circuit.

8. An optical regeneration repeater according to claim 7, wherein said first clock extraction means further includes a full-wave rectifier and a limitting amplifier.

9. An optical regeneration repeater according to claim 2, wherein said first clock extraction means includes a PLL circuit.

10. An optical regeneration repeater according to claim 2, wherein said second clock extraction means includes a tank circuit.

11. An optical regeneration repeater according to claim 2, wherein said second clock extraction means includes a PLL circuit.

12. An optical regeneration repeater according to claim 2, wherein said second clock extraction means includes at least two PLL circuits coupled in series.

13. An optical regeneration repeater according to claim 2, further comprising means for forming a third clock having a frequency which is different from said first clock, wherein said second clock extraction means generates said second clock from said third clock.

14. An optical transmission system comprising a plurality of regeneration repeater according to claim 1.

15. An optical transmission system according to claim 14, further comprising a repeater amplifier between said opt.

16. A method of optical regenerating comprising the steps of:
    receiving an input optical signal containing a jitter, and regenerating data from said input optical signal using a first clock extracted from said input optical signal and containing said jitter;
    intensity-modulating a transmission optical signal having an uncontinuous phase in such a manner as to suppress a Brillouin scattering, in synchronism with a second clock which is independent of said jitter, and on a basis of the data regenerated in said receiving step.

17. An optical regenerator comprising:
    a photoelectric converter for receiving an input optical signal containing a jitter and having an uncontinuous phase in such a manner as to suppress a stimulated Brillouin scattering, and forming a first electrical signal from a received said input optical signal;
    a tank circuit for regenerating a first clock signal for generating said first electrical signal from said input optical signal, said first clock signal containing said jitter;
    processing means for processing said first electrical signal and forming transmission data;
    a second tank circuit regenerating a second clock signal on a basis of said first clock signal, said second clock signal not containing said jitter;
    a transmission signal generator for generating a transmission optical signal having an uncontinuous phase in such a manner as to suppress a stimulated Brillouin scattering; and
    a modulator for intensity-modulating said transmission optical signal on a basis of said transmission data in synchronism with said second clock signal.

18. An optical transmission system comprising a plurality of optical regenerates according to claim 17.

19. An optical transmission system according to claim 18, further comprising a repeater amplifier between the optical regenerators.

20. An optical regenerator comprising:
    a photoelectric converter for receiving an input optical signal containing a jitter and having an uncontinuous phase in such a manner as to suppress a stimulated Brillouin scattering, and forming a first electrical signal from a received said input optical signal;
    a first clock extraction circuit for regenerating a first clock signal for generating said first electrical signal from said input optical signal, said first clock signal containing said jitter;
    means for reducing a frequency of said first clock signal and a frequency of said first electrical signal thereby to form a second clock signal and a second electrical signal;
    first processing means for processing said second electrical signal in synchronism with said second clock signal and forming a processed data;
    a first PLL circuit for removing the jitter from said second clock signal so as to generate a third clock signal;
    a second PLL circuit for generating a transmission clock signal from said third clock signal;
    second processing means for forming transmission dam from said processed data in synchronism with said third clock signal;
    an elastic buffer for synchronizing a transfer of said receiving data from said first processing means to said second processing means;
    means for increasing a frequency of said transmission data;
    a transmission signal generator for generating a transmission optical signal having an uncontinuous phase in such a manner as to suppress a stimulated Brillouin scattering; and
    a modulator for intensity-modulating said transmission optical signal on a basis of said transmission data in synchronism with said transmission clock signal.

21. An optical transmission system comprising a plurality of optical regenerators according to claim 20.

22. An optical transmission system according to claim 21, further comprising a repeater amplifier between said optical regenerators.

* * * * *